United States Patent [19]

Goode, Jr.

[11] 4,109,527
[45] Aug. 29, 1978

[54] DEVICE FOR MEASURING PH AND TEMPERATURE OF A LIQUID, WHICH INCLUDES A MEMORY

[75] Inventor: John V. Goode, Jr., Lake Jackson, Tex.

[73] Assignee: The Dow Chemical Company, Midland, Mich.

[21] Appl. No.: 735,234

[22] Filed: Oct. 26, 1976

[51] Int. Cl.² .............................................. G01K 1/02
[52] U.S. Cl. .................................... 73/343.5; 73/344
[58] Field of Search ............. 73/340, 341, 342, 343 R, 73/343.5, 344, 362 R, 362 AR; 324/111

[56] References Cited

U.S. PATENT DOCUMENTS

| | | | |
|---|---|---|---|
| 3,272,012 | 9/1966 | Seney | 73/341 |
| 3,880,007 | 4/1975 | Emschermann et al. | 73/359 X |
| 3,946,364 | 3/1976 | Codomo et al. | 73/340 X |
| 3,970,074 | 7/1976 | Mogos et al. | 73/342 X |

Primary Examiner—Charles A. Ruehl
Attorney, Agent, or Firm—V. Dean Clausen

[57] ABSTRACT

Disclosed is a portable electronic probe device, including a memory system, which is useful for measuring the pH and temperature of a liquid. The pH sensor consists of a glass electrode-reference electrode combination. The temperature sensor is made up of a thermistor fitted into a well enclosure at the bottom of the probe. A display box attached to the probe contains a memory system. The pH and temperature value is received by the memory system as an electrical signal. The signals are amplified, converted from analog to digital data, and stored in a digital memory.

The pH and temperature data, and the precise location at which the measurement is taken, appear continuously as digital displays in a transparent panel on the display box. When the memory is full the probe device is placed in a charger stand to re-charge a battery in the memory system by a magnetic "coupling" sequence. At the same time, the data in the memory is clocked into a computer-recorder associated with the charger stand, using an optical "blocking" technique. In this device the memory system can record and store pH and temperature data from up to 192 locations before it becomes full.

5 Claims, 4 Drawing Figures

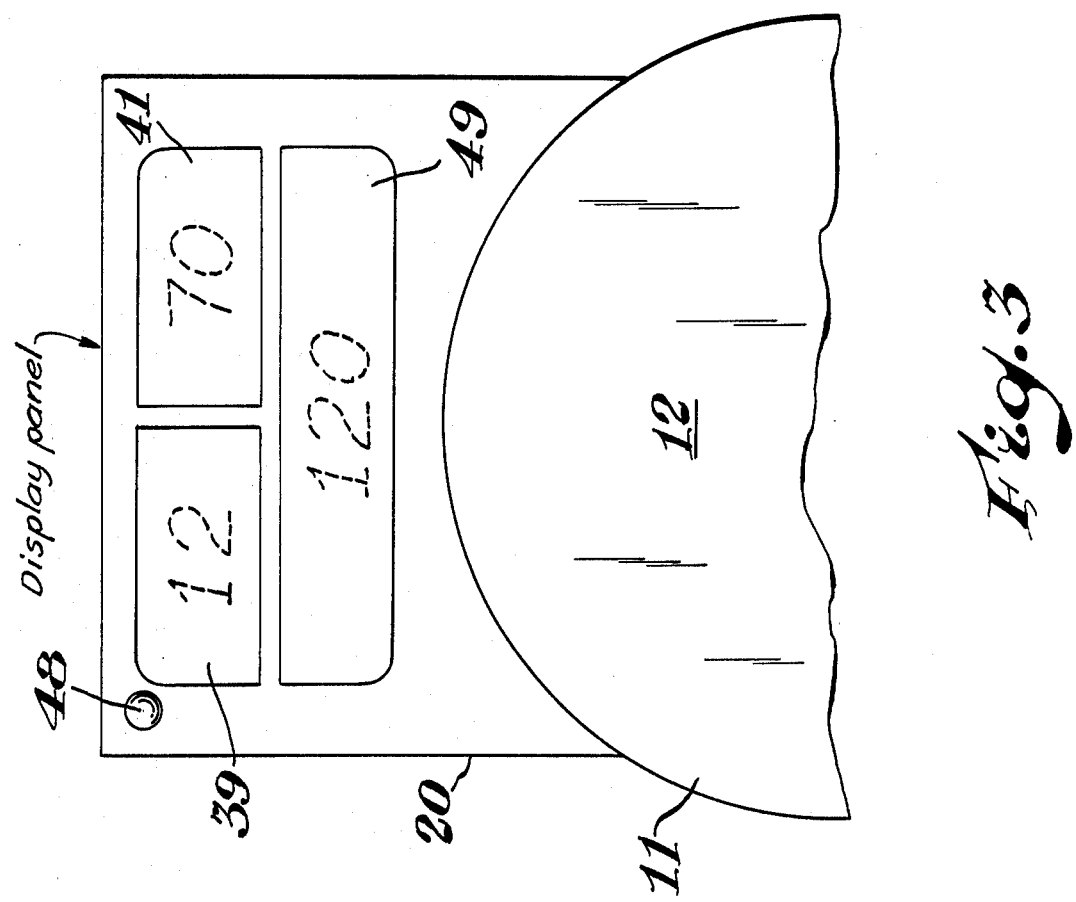
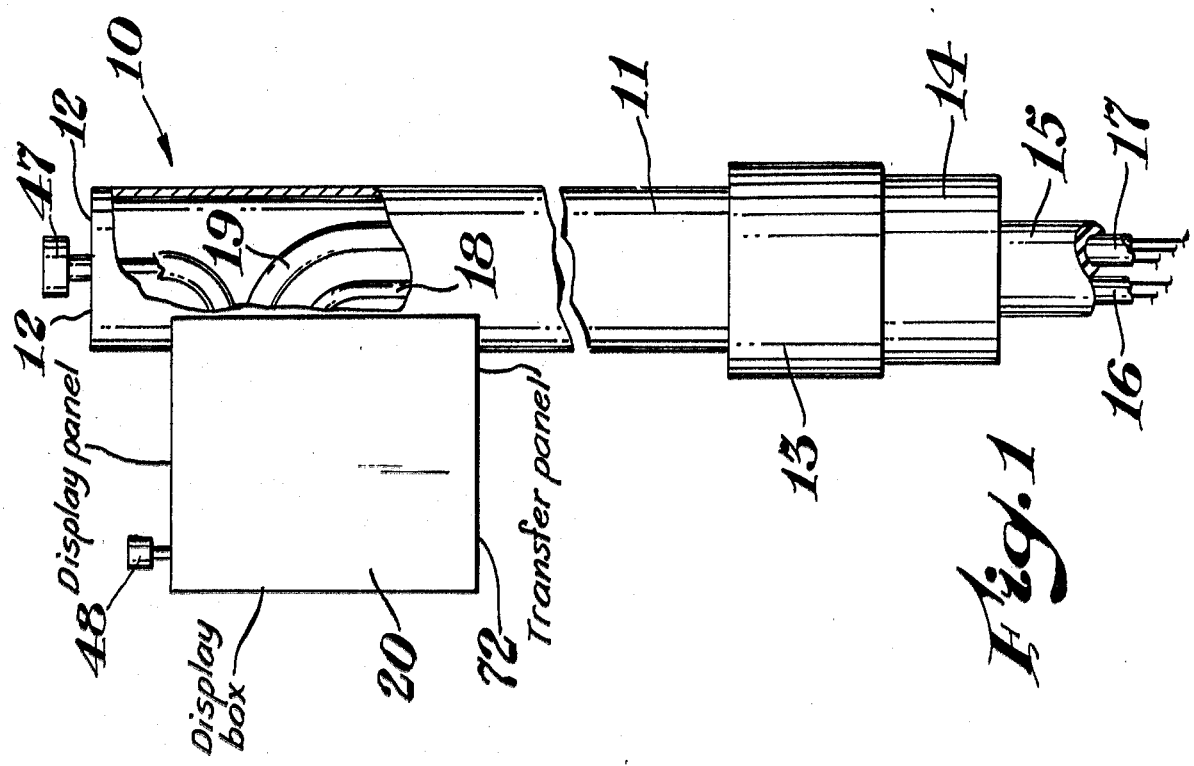

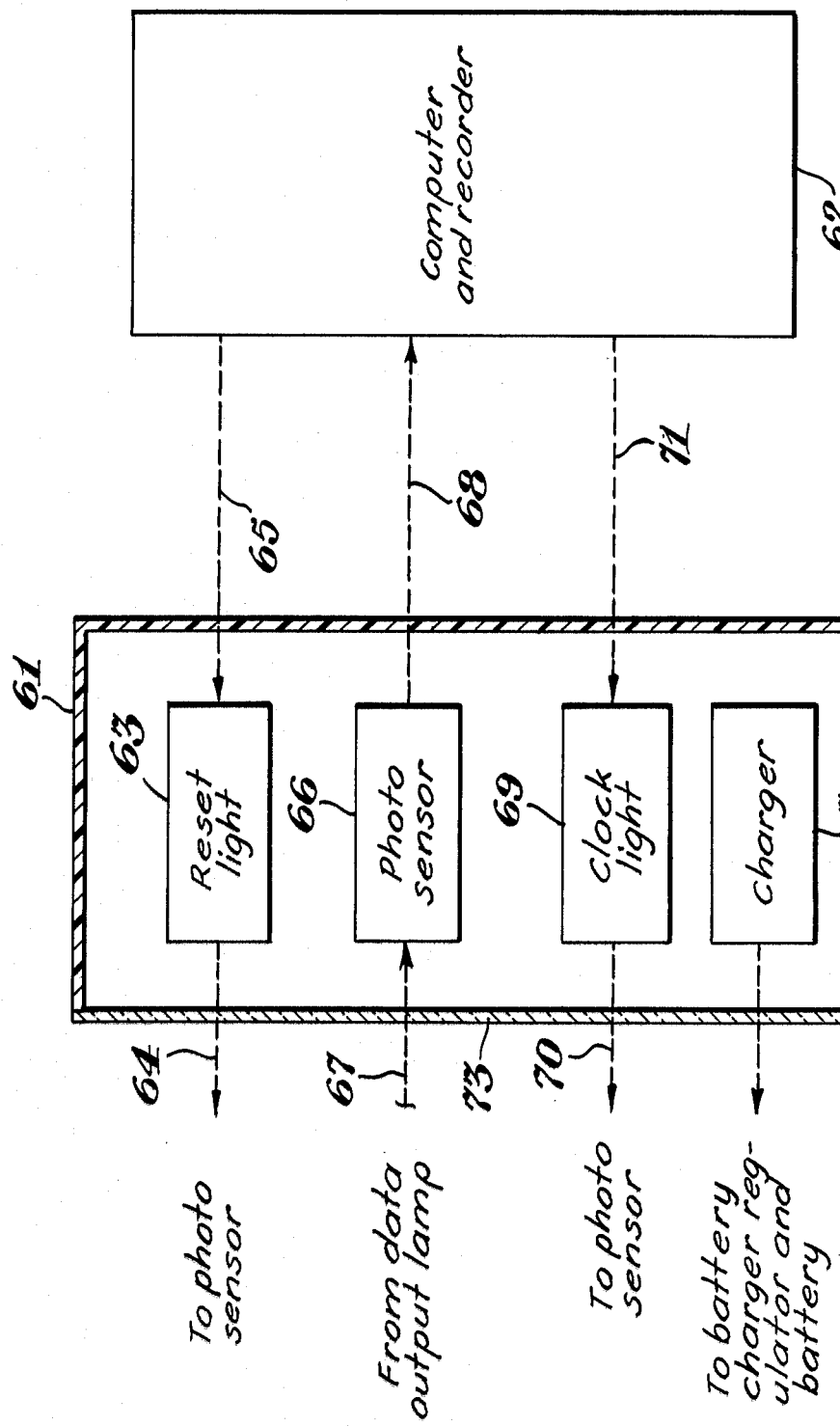

DEVICE FOR MEASURING PH AND TEMPERATURE OF A LIQUID, WHICH INCLUDES A MEMORY

BACKGROUND OF THE INVENTION

This invention relates to an instrument for measuring the pH and temperature of a liquid medium. More specifically, this instrument is an electronic probe having a memory system which permits measuring pH and temperature of liquids at many locations, storing the information in the memory, and later retrieving the information.

In the chemical industry there are many situations in which it is desirable to monitor the pH and the temperature of a liquid body or a stream. For example, it is often necessary to check the pH and temperature of waste streams from chemical processes, to avoid thermal pollution and undesirable algae growth in rivers or ponds into which the waste is discharged. A common technique involves using a probe to sample the outfall stream and manually recording the location at which the sample is taken. Each sample is then returned to a laboratory for analysis.

This procedure has several disadvantages. One drawback is that it requires the handling and disposal of many samples, which takes a considerable amount of time and effort. Another disadvantage is that with the type of probes which are now available two men are required to perform the sampling technique. One man manipulates the probe to obtain the sample and a second man is needed to record the data picked up by the probe. Since a separate step is required to record the data, errors in transcription and calculation frequently occur.

SUMMARY OF THE INVENTION

The device of this invention is an electronic probe for measuring the pH and temperature of a liquid medium, and for storing data relating to the pH and temperature. The device includes an elongate tubular member with a closed top end and a connector member at the bottom end. A probe member, which has a means for sensing pH and temperature values, and converting these values to electrical signals, is connected into the bottom end of the tubular member. A display box is attached to the tubular member. The display box includes a display panel at the top end, which is adapted for displaying a digital record corresponding to the pH value, the temperature value, and the location at which each measurement is taken.

An electronic master memory system, including a power source, is contained within the display box. The pH and temperature sensing means are connected into the memory system. The memory system includes a means for conditioning the pH and temperature signals to meet analog-to-digital requirements. A second means converts the analog data to digital data. Another means stores the digital data and makes it available for display in the display panel. When the memory becomes full the stored data can be retrieved by a computer-recorder. At the same time that the data is being retrieved, a charger means can be used to re-charge the power source in the memory.

DESCRIPTION OF THE DRAWINGS

FIG. 1 is a side elevation view, partly in section, of one form of an electronic probe device, which includes a memory system, according to this invention.

FIG. 2A is a schematic illustration of a charger stand and associated computer-recorder, for re-charging a power source in the memory system and retrieving data from the memory.

FIG. 3 is a plan view of a display panel, which is one part of the memory system of the probe device.

DESCRIPTION OF A PREFERRED EMBODIMENT

Figure 2:
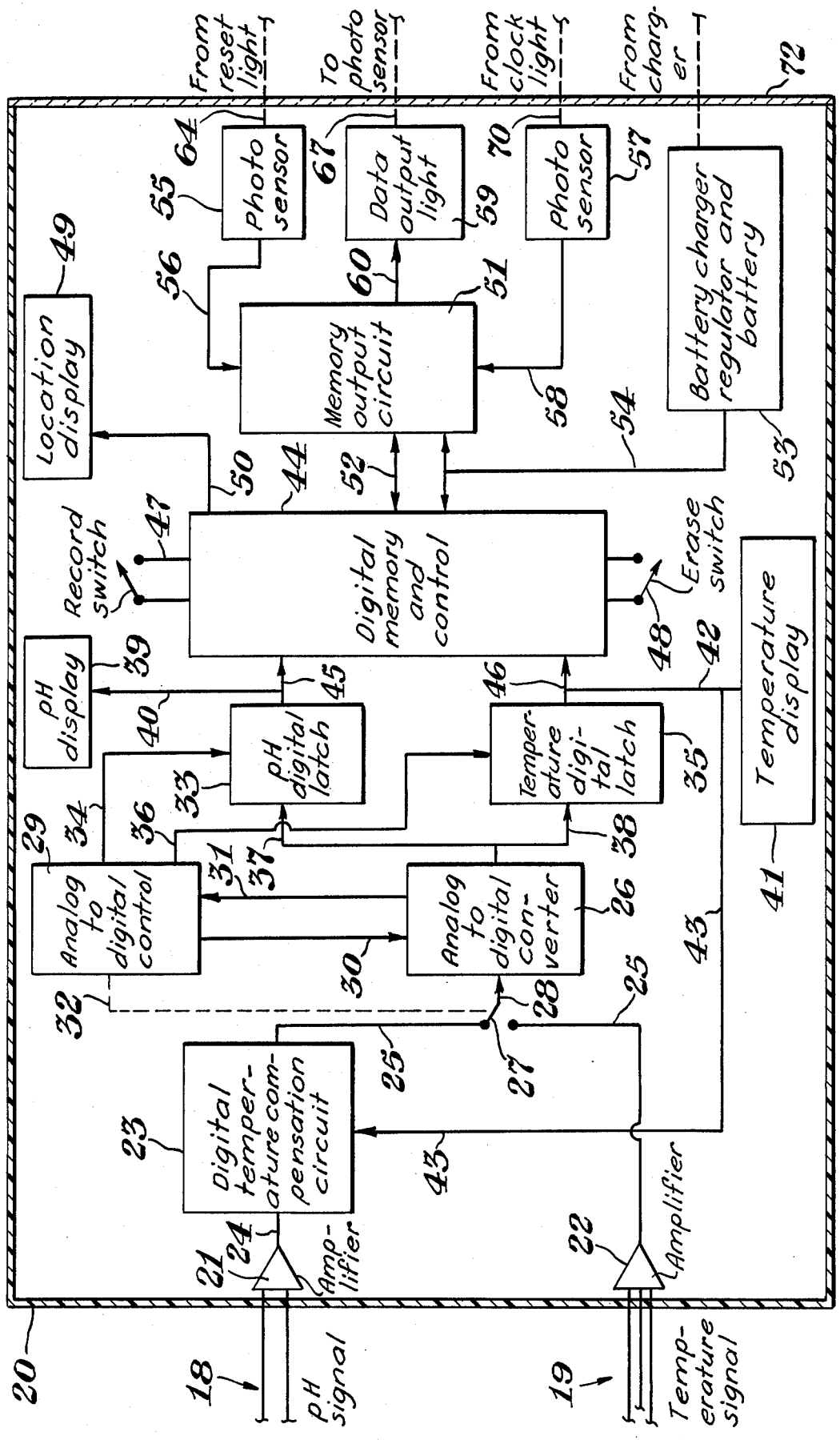
FIG. 2 is a block diagram illustrating the electronic components which make up the memory system of the probe device.

In the drawing, referring particularly to FIG. 1, the numeral 10 refers to the electronic probe device of this invention. The device comprises an elongate tubular member 11, having a closed top end 12. A female electrical connector fitting 13 defines the bottom end of member 11. The connector fitting 13 is coupled into a male connector fitting 14. Fitting 14 defines the top end of a probe 15.

The bottom end of probe 15 includes a means for sensing the pH of a liquid medium, and also a means for sensing the temperature of the liquid. The bottom end of the probe and the pH and temperature sensing means are not illustrated in the drawing. Any suitable electrical means for sensing pH and temperature may be used. In the present invention the pH sensing means comprises a suitable glass electrode-reference electrode combination. A preferred temperature sensor is made up of a thermistor which is immersed in a well unit positioned at the bottom of the probe.

An electrical lead (2-wire) from the pH electrodes, indicated by numeral 16, extends into the female fitting 13. A similar electrical lead (3-wire) from the temperature sensor, indicated by numeral 17, also extends into the female fitting 13. In fitting 13 the leads 16 and 17 connect into the upper leads 18 and 19, respectively. A display box 20 is mounted on the tubular member 11 near the top end of the member. The display box 20 provides a sealed enclosure which is impervious to atmospheric moisture and to corrosive vapors.

An electronic master memory system, shown schematically in FIG. 2, is contained within the display box 20. Referring particularly to FIG. 2, the master memory system includes a first amplifier 21 and a second amplifier 22. Upper lead 18, for the pH signal, connects into amplifier 21. The temperature signal is carried to amplifier 22 through upper lead 19. Amplifier 21 is connected into a digital temperature compensation circuit 23 by lead 24. Amplifier 22 is connected into the circuit 23 by a lead 25.

An analog-to-digital converter 26 connects into the compensation circuit 23 through switch 27 and lead 28. A control means 29 (analog-to-digital) is connected into converter 26 by an input lead 30 and output lead 31. Control 29 is also linked into switch 27, as indicated by a broken line 32. Data relating to the pH value is stored by a digital latch component 33, which connects into control 29 through lead 34. The temperature data is stored by a similar digital latch 35, which connects into control 29 through lead 36. Converter 26 is connected into latch 33 by a lead 37, and into latch 35 through a lead 38.

Numeral 39 refers to a display panel for the pH value. The actual display panel is located on the top end of the display box 20, as shown in the plan view of FIG. 3. A lead 40 connects the panel 39 into latch 33. A display panel for the temperature value is indicated by numeral 41. The temperature panel 41 is located adjacent to the pH panel 39 on the top end of the display box 20 (see FIG. 3). Panel 41 is connected into latch 35 by a lead 42, and into the compensation circuit 23 by a lead 43.

A digital memory and control component 44 provides a memory means for storing data relating to pH and temperature measurement and the location at which the measurement is taken. The pH latch component 33 connects into the digital memory by a lead 45. A lead 46 connects the temperature latch component 35 into the digital memory. A record switch 47 forms part of the digital memory and control. The switch button is installed on the top end of tubular member 11, as indicated in FIG. 1. Means for erasing data stored in the digital memory and control 44 is provided by an erase switch 48. The switch button is installed on the top end of display box 20 next to the pH display 39, as indicated in FIG. 3.

In the master memory system, the numeral 49 refers to a display panel for indicating a given location for taking a pH and temperature measurement. A lead 50 connects the location display into the digital memory 44. Referring to FIG. 3, the actual panel 49 is located immediately below the pH panel 39 and the temperature panel 41 on the top end of display box 20. A memory output circuit 51 provides means for reading data out of the digital memory 44. Circuit 51 is connected into the memory 44 by a lead 52.

Power to operate the master memory circuit is provided by a small, light-weight battery, which is installed in the display box 20. The battery is connected into a battery charger regulator. The battery and regulator components are indicated by numeral 53 in FIG. 2. A common lead 54 connects the battery and regulator unit into the digital memory 44 and the memory output circuit 51.

A photo-sensor 55 provides one component in a circuit which performs a data re-set function in the memory output circuit 51. A lead 56 connects the photo-sensor into the circuit 51. A second photo-sensor 57 is one component in a circuit which performs a clocking function. The sensor 57 is connected into the circuit 51 by a lead 58. Means for removing data from the memory output circuit 51 is provided by a data output light 59. Light 59 is connected into the memory output 51 by a lead 60.

In FIG. 2A is shown a charger stand 61 and a computer-recorder 62, in operating association with the charger stand. These components provide a means for re-charging the battery 53 and for retrieving data from the digital memory and control 51. A re-set light 63 in stand 61 is adapted to transmit an optical signal 64 (light burst) to the photo-sensor 55. Light 63 is connected into computer 62 by a lead 65. A photo-sensor 66 is adapted to receive an optical signal 67 (light burst) from the data output light 59.

A lead 68 connects the sensor 66 into computer 62. A clock light 69 provides means for clocking data into computer 62 from the digital memory and control 51. An optical signal (light burst) from light 69 to the photo-sensor 57 is indicated by numeral 70. Light 69 is connected into the computer 62 by a lead 71.

OPERATION

A typical operation of the present device will now be described to illustrate the practice of this invention. Since the device 10 is a portable instrument, it can be carried manually from one location to the next. When a pH and temperature measurement is to be taken, the bottom end of probe 15 (not shown) is immersed in a body of liquid to be tested. The electrodes in the probe transmit an electrical signal through lead 16 and upper lead 18 into amplifier 21. The signal received by the amplifier is in the form of analog data which corresponds to the actual hydrogen ion concentration (pH) in the liquid.

A thermistor device in the bottom end of the probe takes the temperature measurement. The temperature value sensed by the thermistor is also represented by an electrical signal. This signal is transmitted through lead 17 and upper lead 19 into amplifier 22, where it is received in the form of analog data. Referring to FIG. 2, the function of amplifiers 21 and 22 is to condition the respective pH and temperature signals to meet analog-to-digital requirements. The analog output from each amplifier is converted to digital form by a single analog-to-digital converter 26. The converter 26 includes a decoder component which converts the digital data to binary coded decimal data. The output from converter 26 is thus in the form of BCD data.

From converter 26 the pH data is latched into the digital latch 33 and the temperature data is latched into the digital latch 35. This sequence is initiated and controlled by the analog-to-digital control 29. The latched data is then displayed in the display panel at the top end of the display box 20. The pH data will appear as a two-digit display in panel 39. The temperature data is also a two-digit display, which appears in panel 41.

The next sequence is to record the current pH and temperature data in the digital memory and control 44. This is done by depressing the switch button 47 at the top end of member 11. In actual practice, the operator waits a few seconds after the digital display appears before depressing button 47. The wait period is to allow the display to become stable, i.e. no change in the numerals, before the data is stored in memory 44.

As shown in FIG. 2, the analog output from amplifier 21 (pH data) is fed into the digital temperature compensation circuit 23. Following the latching sequence, the temperature data output from latch 35 is also fed back through the temperature compensation circuit 23. The function of circuit 23 is to eliminate a possible pH response change with temperature. In this invention the temperature compensation circuit is adapted specifically for use with a glass electrode means for measuring pH. If other systems are used to measure pH, the temperature compensation circuit can be modified accordingly.

The three-digit display in panel 49 designates the location at which a given pH and temperature measurement is taken. In the memory system of the invention it is possible to record a pH and temperature measurement from 192 separate locations. For example, the numerals 001 will appear in panel 49 for the first location, and the numerals 192 for the last location. After 192 measurements have been taken, the display in panel 49 goes blank, thus indicating to the operator that the memory 44 is full.

In some situations the operator may decide not to record the pH and temperature data from a given location. To insure that this data is not stored in memory 44, the operator can depress the switch button 48. When button 48 is depressed the digital data relating to pH and temperature is erased from the display and blocked from entering the memory 44. At the same time that the data is erased, the memory 44 causes the location display to advance to the next position. After data has been obtained from 192 locations, the memory 44 is full and the display panel 49 goes blank.

When memory 44 becomes full, the next sequence is to recharge the battery 53 and to transfer the stored data in the memory to the computer-recorder 62. This is done by placing the probe device 10 in the charger stand 61. When the probe is placed in the stand a window panel 72 at the bottom end of display box 20 interfaces with a window panel 73 at the top end of the charger stand. A charger unit 74 in stand 61 comprises one piece of a split transformer (2 piece unit) and a power source. The other piece of the split transformer connects into the battery and regulator circuit 53 in the display box.

After the probe 10 is placed in stand 61, and the respective window panels are properly interfaced, the battery circuit 53 signals the charger 74 to charge the battery. The battery charging sequence is thus accomplished by a magnetic "coupling" of the probe with the charger stand. At the same time that the battery is being charged, the circuit 53 signals the memory output circuit 51 that the probe is in the stand. The effect of this signal is to enable the memory output circuit to convert from a "write" to "read" sequence.

The next step is to remove the stored data from the memory output circuit 51 and record it in the computer-recorder 62. To initiate this step, the operator turns on the computer. In the first sequence a light pulse from re-set light 63 to the photo-sensor 55 signals the memory output circuit 51 to "re-set" the stored data. The effect here is to enable circuit 51 to output the pH and temperature data starting from the first location at which the data was obtained.

Following a short delay after the re-set sequence, the clock light 69 delivers intermittent light pulses to the photo-sensor 57 to initiate the "clocking" sequence. In this sequence the data stored in circuit 51 is delivered, one bit at a time, from the data output line 59, to the photo-sensor 66, and into the computer-recorder 62. The data retrieval function is thus accomplished by an optical "coupling" of the probe device 10 to the charger stand 61. After all the data is retrieved by the computer-recorder 62, the memory system becomes blank and the battery continues charging, so that the probe device is again ready for use.

The invention claimed is:

1. An electronic probe device for measuring the pH and the temperature of a liquid medium and storing data relating to said pH and temperature, the device including:
    an elongate tubular member having a closed top end, and a connector member defining the bottom end;
    the bottom connector being adapted for connection to an electronic probe member, the probe member including means for sensing a pH value and a temperature value in a liquid medium, and for converting the pH and temperature values to an electrical signal;
    a display box which is attached to the tubular member, which includes a display panel at the top end of the box, and which includes a first transfer panel at the bottom end of the box;
    the display panel being adapted for displaying a digital record corresponding to the pH value, the temperature value, and a given location at which each pH and temperature value is obtained;
    an electronic master memory system which is contained within the display box, and which is connected into the pH and temperature sensing means of the probe member;
    the master memory system including a power source, means for controlling the pH and temperature signals to meet analog-to-digital requirements, means for converting the analog data to digital data, means for storing the digital data relating to pH and temperature values, means for storing data in digital form which relates to the location at which the pH and temperature measurement is taken, and switch means for commanding the stored digital data to appear in the display panel as the digital record.

2. The probe device of claim 1 in which the first transfer panel on the display box is adapted to interface with a second transfer panel, the second panel defining part of a means for re-charging the power source in the master memory system, the re-charge means being associated with a means for retrieving the stored digital data from the master memory system.

3. The probe device of claim 1 in which the master memory system includes a switch means for causing the stored digital data to be erased from the said digital data storage means.

4. The probe device of claim 1 which is a portable device capable of being manually carried from one location to the next.

5. In combination, an electronic probe device with a memory system, for measuring the pH and temperature of a liquid medium and storing data relating to the said pH and temperature, and a means for retrieving the stored data from the memory system and re-charging a power source in the memory system, the combination comprising:
    an elongate tubular member having a closed top end and a connector member defining the bottom end;
    the bottom end being adapted for connection to an electronic probe member, the probe member including means for sensing a pH value and a temperature value in a liquid medium and for converting the pH and temperature values to an electrical signal;
    a display box which is attached to the tubular member, which includes a display panel at the top end of the box, and which includes a first transfer panel at the bottom end of the box;
    the display panel being adapted for displaying a digital record corresponding to the pH value, the temperature value, and a given location at which each pH and temperature value is obtained;
    an electronic master memory system which includes a power source, means for conditioning each signal to meet analog-to-digital requirements, means for converting the analog data to digital data, means for storing the digital data relating to pH and temperature values, means for storing data in digital form which relates to the location at which the pH and temperature measurement is taken, and switch means for commanding the stored digital data to appear in the display panel as the digital record;

the first transfer panel being in an interface relation with a second transfer panel defined in a charger stand;

the charger stand including means which transmits power through each transfer panel into the power source in the display box to re-charge the said power source;

the master memory system including light means for optically transmitting the stored digital data through the first and second transfer panels to a photo-sensor means in the charger stand; and the photo-sensor means being adapted to transmit the stored data to a computer system associated with the charger stand.

* * * * *

UNITED STATES PATENT AND TRADEMARK OFFICE
CERTIFICATE OF CORRECTION

PATENT NO. : 4,109,527
DATED : Aug. 29, 1978
INVENTOR(S) : John V. Goode, Jr.

It is certified that error appears in the above-identified patent and that said Letters Patent are hereby corrected as shown below:

In the Abstract, line 20, delete "blocking" and insert --"coupling"--.

Column 5, line 46, delete "line" and insert --light--.

Column 6, line 12, delete "controlling" and insert --conditioning--.

Signed and Sealed this

Tenth Day of April 1979

[SEAL]

Attest:

RUTH C. MASON
Attesting Officer

DONALD W. BANNER
Commissioner of Patents and Trademarks